(Model.)
J. KENTON.
HARROW.
No. 273,105. Patented Feb. 27, 1883.
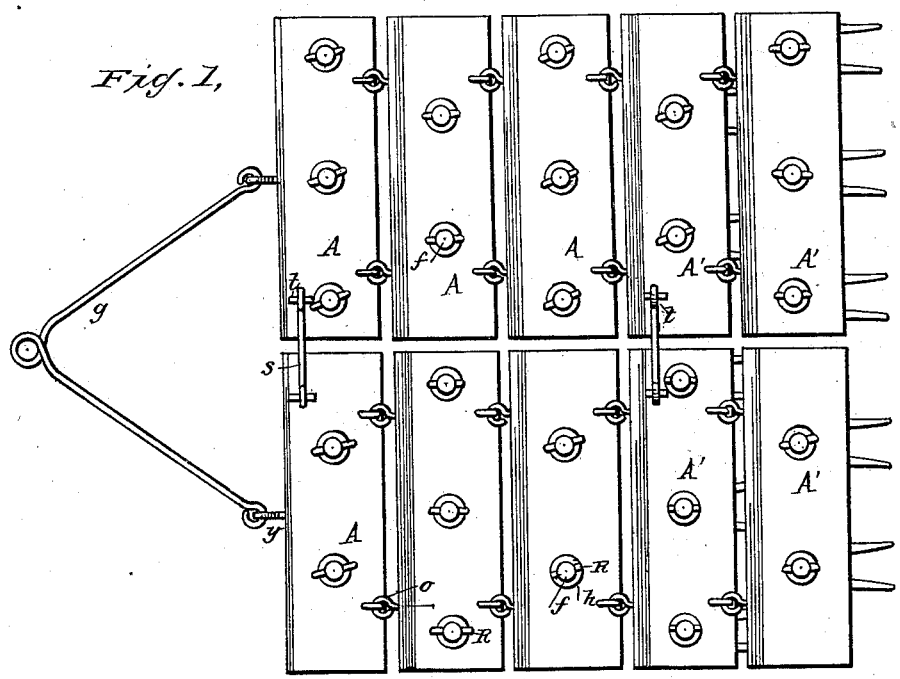
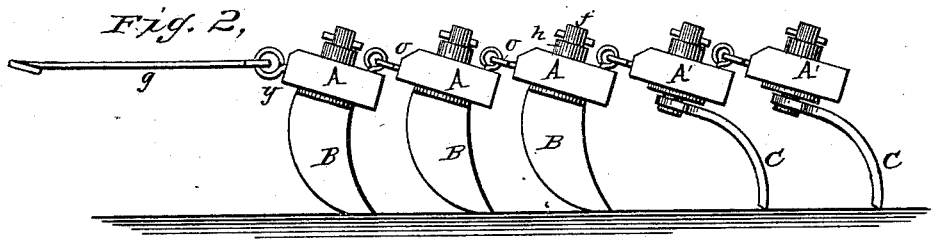
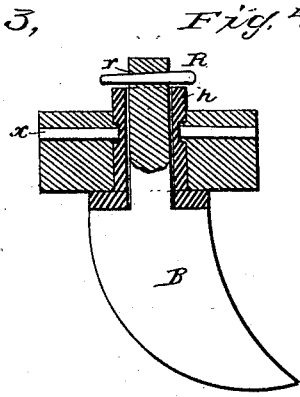
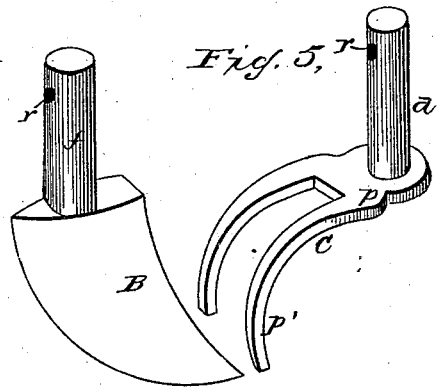
WITNESSES:
Fred. G. Dieterich
Charles H. Baker
INVENTOR.
James Kenton
By J. H. McDonald
ATTORNEY

UNITED STATES PATENT OFFICE.

JAMES KENTON, OF URBANA, OHIO.

HARROW.

SPECIFICATION forming part of Letters Patent No. 273,105, dated February 27, 1883.

Application filed June 7, 1882. (Model.)

*To all whom it may concern:*

Be it known that I, JAMES KENTON, of the city of Urbana, in the county of Champaign and State of Ohio, have invented a new and Improved Harrow, which improvement is fully set forth in the following specification and accompanying drawings, in which—

Figure 1 is a plan view of my improved harrow. Fig. 2 is a side view of same. Fig. 3 is a vertical section through one of the cutting-teeth. Fig. 4 is a perspective view of one of the cutting-teeth, and Fig. 5 a perspective view of one of the pulverizing-teeth.

The object of the invention is to provide a harrow made flexible, so as to adapt itself to the inequalities of the ground, and which will leave the ground passed over in a finely-pulverized condition. To secure this object the sections of the harrow are hinged to each other horizontally and at right angles to the draft, each section-bar from front to rear being hinged with linked eyebolts to the upper edge of each preceding bar, thus causing each bar to drop at its rear edge the thickness of each preceding bar. By this arrangement the harrow is given such an irregular lower surface as will readily reduce any clods or lumps that might work up to the surface while the harrow is moving. One or more bars without teeth may be hinged to the rear toothbars, for the purpose of holding down the rear edges of the last bars carrying teeth, and also assist in smoothing the ground after the harrow-teeth have passed over it. Two or more harrow-sections may be hinged together laterally, so as to form a broad harrow and allow it to cover any irregularity of the ground.

Referring more particularly to the drawings, I have shown in Fig. 1 a series of harrow-sections, A A', hinged laterally by the links *s*, hooked into eyebolts *t*. Each side section, A A', may be hinged together laterally in this or any other suitable way. The sections A A' are hinged together from front to rear by means of suitable eyebolts, *o*. The first three bars of the harrow are provided with swiveled cutting-teeth B, Fig. 2. These teeth are made of steel and heavy enough for the purpose required. These teeth B are curved front and rear, the front edge being sharpened, and projecting from the top of the tooth is a shank, *f*. The rear bars have inserted in them a series of forked pulverizing-teeth, C. The front end of each tooth C is made with a plate, *p*, to which the shank *d* is secured, the forks *p'* being curved back from the plate a portion of their length and then bent downward, as shown in Fig. 5. The shanks *f d* of the several teeth enter cast-iron sockets *h*, which pass through and are secured to the bars A A', thus enabling the teeth to turn freely in the sockets and present themselves constantly to the line of draft. The shanks *f d* may have holes *r* bored through them, through which a pin, R, passes and prevents the teeth from dropping out, said pin R turning over the top of the socket. The sockets and shanks may be secured to each other and to the bars in any other suitable way. A bent drag-rod, *g*, secured to eyebolts in the front bars of the harrow, affords means for drawing the harrow. As the harrow moves over the ground the front teeth not only cut the clods, but assist by their weight in breaking them. The rear forked teeth, C, act to catch and drag the smaller clods and lumps and thoroughly break them up, thus leaving the ground passed over in a highly-pulverized state.

This form of construction of harrow is not only advantageous in clay and other hard lands, which get "lumpy" after plowing, but is essentially useful in prairie or sod lands. It is well known that the ordinary form of harrow does not break up the sod finely enough, and, above all, does not loosen the earth from the grass-roots, and the consequence is that sod soon "sets" and takes root, leaving the ground unfit for planting. Now, by my harrow the sod is first finely cut by the front teeth, B, while the earth is torn and pushed away from the grass-roots by the forked teeth C.

I am aware that a flexible harrow is not new. I am also aware that a harrow with swiveled cutting-teeth is not new, and such I do not broadly claim. I am not aware, however, that a harrow having swiveled front cutting-teeth and swiveled rear forked teeth has ever before been used.

What I claim, therefore, is—

1. In a harrow the tooth-bars and sections of which are flexibly connected, the combination of a series of front knife-shaped cutting-teeth, B, and rear forked pulverizing-teeth, C, said teeth being swiveled in the bars by means of shanks entering sockets secured in the bars, substantially as shown and described, and for the purpose set forth.

2. In a harrow made substantially as described, the forked teeth C, having the shank $d$ and plate $p$, the forked ends being curved outwardly from the plate and then bent downward, substantially as shown and described.

JAMES KENTON.

Attest:
SYLVANUS MILLER,
FRANK E. REID.